United States Patent
Tanimoto (10) Patent No.: US 10,498,206 B2
(45) Date of Patent: Dec. 3, 2019

(54) ELECTRIC TOOL

(71) Applicant: Hitachi Koki Co., Ltd., Tokyo (JP)

(72) Inventor: Hideyuki Tanimoto, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 367 days.

(21) Appl. No.: 15/314,100

(22) PCT Filed: May 22, 2015

(86) PCT No.: PCT/JP2015/064754
§ 371 (c)(1),
(2) Date: Nov. 28, 2016

(87) PCT Pub. No.: WO2015/182509
PCT Pub. Date: Dec. 3, 2015

(65) Prior Publication Data
US 2017/0194846 A1 Jul. 6, 2017

(30) Foreign Application Priority Data
May 30, 2014 (JP) .................................. 2014-112509

(51) Int. Cl.
*B25D 11/00* (2006.01)
*B25D 16/00* (2006.01)
(Continued)

(52) U.S. Cl.
CPC ............ *H02K 21/16* (2013.01); *B25D 11/00* (2013.01); *B25D 16/00* (2013.01); *B25F 5/00* (2013.01);
(Continued)

(58) Field of Classification Search
CPC ...................... B25D 2250/095; H02K 2213/03
(Continued)

(56) References Cited

U.S. PATENT DOCUMENTS 5,045,742 A * 9/1991 Armstrong ............. H02K 1/146
310/216.013
6,008,559 A * 12/1999 Asano .................. H02K 1/2766
310/156.53

(Continued)

FOREIGN PATENT DOCUMENTS

JP 2003-224938 8/2003
JP 2007-259513 10/2007

(Continued)

OTHER PUBLICATIONS

J.R. Hendershot Jr and TJE Miller; "Design of Brushless Permanent-Magnet Motors"; Magna Physics Publishing (1994).*

(Continued)

*Primary Examiner* — Gloria R Weeks
*Assistant Examiner* — Patrick B Fry
(74) *Attorney, Agent, or Firm* — JCIPRNET (57) ABSTRACT

An electric tool is provided with a rotary striking mechanism unit converting the rotational force of a brushless motor to a striking force and applying the striking force to a tip tool. The required rated input of the motor is 1000-1300 W, the motor speed under fixed speed control is 16800±10% (min$^{-1}$), and the variable Ku, which relates to the motor, is defined by the following expression Ku={(stator core outer diameter)$^2$×(stator core lamination thickness)×(total tooth width)×(rotor outer diameter)}÷{(rated input)×(motor speed under fixed speed control)}, wherein the stator core outer diameter, the stator core lamination thickness, the total tooth width and the rotor outer diameter are shown in mm, the rated input is shown in W, the motor speed is shown in min$^{-1}$, and the Ku value of the motor is set to 14.6<=Ku<=21.8.

4 Claims, 6 Drawing Sheets

(51) Int. Cl.
*B25F 5/00* (2006.01)
*H02K 1/14* (2006.01)
*H02K 1/27* (2006.01)
*H02K 3/18* (2006.01)
*H02K 21/16* (2006.01)
*H02K 29/00* (2006.01)

(52) U.S. Cl.
CPC ........... *H02K 1/146* (2013.01); *H02K 1/2706* (2013.01); *H02K 3/18* (2013.01); *H02K 29/00* (2013.01); *B25D 2211/068* (2013.01); *B25D 2250/095* (2013.01); *H02K 2213/03* (2013.01)

(58) Field of Classification Search
USPC ............................................ 173/217; 310/50
See application file for complete search history.

(56) References Cited

U.S. PATENT DOCUMENTS

| | | | | |
|---|---|---|---|---|
| 6,218,760 | B1* | 4/2001 | Sakuragi | H02K 29/03 310/216.074 |
| 6,707,209 | B2* | 3/2004 | Crapo | H02K 1/278 310/154.01 |
| 8,207,647 | B2* | 6/2012 | Du | H02K 1/148 310/216.091 |
| 8,338,994 | B2* | 12/2012 | Tanimoto | H02K 9/06 310/180 |
| 9,214,838 | B2* | 12/2015 | Li | H02K 1/276 |
| 2011/0000688 | A1* | 1/2011 | Iwata | B25B 21/00 173/1 |
| 2011/0171887 | A1* | 7/2011 | Tanimoto | B24B 23/028 451/359 |
| 2013/0000934 | A1* | 1/2013 | Tadokoro | B25B 21/00 173/20 |
| 2014/0131059 | A1* | 5/2014 | Verbrugge | B25F 5/008 173/217 |
| 2015/0349593 | A1* | 12/2015 | Jiang | H02K 1/2786 310/43 |

FOREIGN PATENT DOCUMENTS

| | | |
|---|---|---|
| JP | 2010-269409 | 12/2010 |
| JP | 2013-111734 | 6/2013 |

OTHER PUBLICATIONS

Mario Jurkovic and Damir Zarko; "Optimizied Design of a Brushless DC Permanent Magnet Motor for Propulsion of an Ultra Light Aircraft"; Automatika vol. 53 No. 3, p. 244-254 (2012).*

"International Search Report (Form PCT/ISA/210)", dated Aug. 18, 2015, with English translation thereof, pp. 1-3.

* cited by examiner

ELECTRIC TOOL

CROSS-REFERENCE TO RELATED APPLICATION

This application is a 371 application of an International PCT application serial no. PCT/JP2015/064754, filed on May 22, 2015, which claims the priority benefits of Japan Application No. 2014-112509, filed on May 30, 2014. The entirety of each of the above-mentioned patent applications is hereby incorporated by reference herein and made a part of this specification.

BACKGROUND OF THE INVENTION

Field of the Invention

The invention relates to an electric tool, such as a hammer drill, an impact drill, an impact wrench, or the like, where a brushless motor is used as a driving source.

Description of Related Art

Electric tools, particularly electric striking tools, such as hammer drill have a mechanical section that is complicated and has a significant amount of components. To maximize the performance of the mechanical section to its full extent, it is very important for the mechanical section to match motor performance.

For example, to solidly match the mechanical section with motor performance, motor speed control utilizing electronic control is applied to suppress variation of a target motor speed within a range of plus or minus a few percentage points. In addition, in order to continuously perform demanding operations, a rated power input (W) of the device is also important. Based on a target value, motor winding, thickness of motor core lamination, or the like may be modified.

Regarding the shape of motor core, a standard motor core capable of achieving average performance in various devices is adopted.

PRIOR ART LITERATURE

Patent Literature

Patent Literature 1: Japanese Patent Publication No. 2007-259513

Patent Literature 1 does not describe specific values as target performance, but includes recitation concerning the optimization of the shape of motor core. However, based on values of target performance (e.g., values of speed, torque, rated power input, cost, etc.), the optimized shape of the motor core may differ. For example, when a high speed motor is optimized, it is more suitable to adopt a reduced rotor outer diameter, so as to stand a centrifugal force. Also, when a high torque is needed, contrary to speeding up the motor, the rotor outer diameter needs to be increased to dispose a larger magnet. Moreover, when a high rated power input is needed, a stator core having larger slots is required to wind stator coils having a greater diameter to reduce a resistance. Furthermore, when the cost is to be reduced, a volume of the magnet disposed to the rotor needs to be reduced to increase a volume of a rotor core.

Thus, regarding the shape of the motor core of Patent Literature 1, where the shape is determined without setting the target performance of the electric tool, there is an issue that the shape may not be an optimal shape for an electric tool, particularly an electric striking tool.

SUMMARY OF THE INVENTION

With awareness of the situation, the invention is achieved to provide an electric tool where optimization is performed for the required target performance and the size allows excellent operability.

A mode of the invention is an electric tool. The electric tool includes an electric striking tool. The electric tool includes: a brushless motor having a stator where stator coils are wound around teeth of a stator core, and a rotor rotatably supported on an inner circumference side of the stator; and a rotary striking mechanism unit, converting a rotational force of the brushless motor into a striking force and applying the striking force to the tip tool. When the brushless motor has a rated power input ranging from 1000 to 1300 W and a motor speed under fixed speed control at 16800±10% revolutions per minute, and an optimization variable Ku relating to the brushless motor is defined by Expression as follows:

$$Ku = \{(\text{stator core outer diameter})^2 \times (\text{stator core lamination thickness}) \times (\text{total tooth width}) \times (\text{rotor outer diameter})\} \div \{(\text{rated power input}) \times (\text{motor speed under fixed speed control})\},$$

wherein the stator core outer diameter is a numerical value shown in mm, the stator core lamination thickness is a numerical value shown in mm, the total tooth width is a numerical value shown in mm, the rotor outer diameter is a numerical value shown in mm, the rated power input is a numerical value shown in W, and the motor speed is revolutions per minute, a value of Ku of the brushless motor is set to $14.6 \leq Ku \leq 21.8$.

In the mode, it is preferable that the rotor has plate magnets.

In the mode, it is preferable that the stator core has six slots.

Another mode of the invention is also an electric tool. The electric tool includes: a brushless motor having a stator where stator coils are wound around teeth of a stator core, and a rotor rotatably supported on an inner circumference side of the stator; and a transmission part transmitting a rotational force of the brushless motor to a tool maintaining element. The brushless motor has a rated power input ranging from 1000 to 1300 W and a motor speed under fixed speed control at 16800±10% revolution per minute. When an optimization variable Ku relating to the brushless motor is defined by Expression as follows:

$$Ku = \{(\text{stator core outer diameter})^2 \times (\text{stator core lamination thickness}) \times (\text{total tooth width}) \times (\text{rotor outer diameter})\} \div \{(\text{rated power input}) \times (\text{motor speed under fixed speed control})\},$$

wherein the stator core outer diameter is a numerical value shown in mm, the stator core lamination thickness is a numerical value shown in mm, the total tooth width is a numerical value shown in mm, the rotor outer diameter is a numerical value shown in mm, the rated power input is a numerical value shown in W, and the motor speed is revolutions per minutes, a value of Ku of the brushless motor is set to $14.6 \leq Ku \leq 21.8$.

In the meantime, any combination of the above forming elements and a method, a system and the like converted from the expression of the invention are also effective as the modes of the invention.

According to the invention, an electric tool as follows is achieved. Namely, the electric tool has a motor size not damaging the operability, and is able to achieve the required target performance, namely the rated power output ranging from 1000 to 1300 (W) and the motor speed under the fixed speed control at 16800±10% (min$^{-1}$).

DESCRIPTION OF THE EMBODIMENTS

In the following, the preferred embodiments of the invention are described in detail with reference to the accompanying drawings. Same or equivalent forming elements, components, processes, and the like shown in the respective figures are marked with the same reference symbols. In addition, repeated descriptions are appropriately omitted. Also, the embodiments merely serve as exemplary examples, instead of limitations of the invention. All the features described in the embodiments or combinations thereof are not necessarily the essence of the invention.

As an embodiment of the electric tool of the invention, an application of a hammer drill as an electrical striking tool is described.

Figure 1:
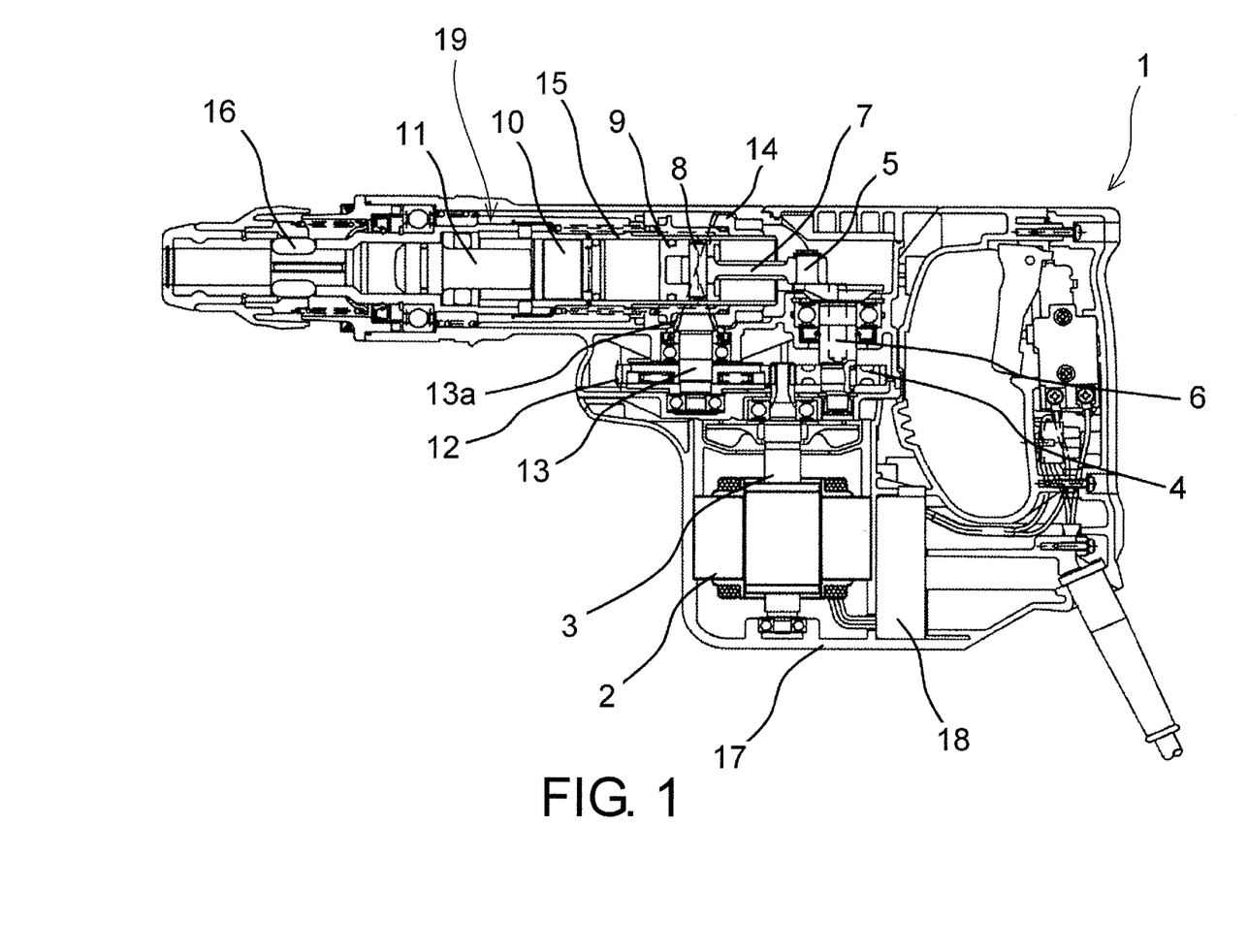
FIG. 1 is a cross-sectional side view illustrating an embodiment of an electric tool of the invention as a hammer drill that is an electric striking tool.

As shown in FIG. 1, a hammer drill 1 includes: a brushless motor 2 configured as a driving force and stored in a housing 17; a rotary striking mechanism unit 19 converting a rotational force of the brushless motor 2 into a striking force and applying the striking force to a tip tool (not shown), such as a drill, installed to a tool maintaining element 16; and a control substrate 18 mounted with a control circuit operating the brushless motor 2.

The control substrate 18 is disposed to a lateral side of the brushless motor 2 and stored in the housing 17.

The rotary striking mechanism unit 19 includes: a striking part (including a first gear 4, a crank shaft 6, a conrod 7, a piston pin 8, a piston 9, a striking piece 10, and an intermediate piece 11), and a rotary transmission mechanism (including a second gear 12, a third gear 14, a cylinder 15, and the tool maintaining element 16). The piston 9, the striking piece 10, and the intermediate piece 11 are slidably disposed in the cylinder 15, and move reciprocally in the cylinder 15.

The hammer drill 1 is configured to be able to perform a striking operation and a rotating operation. The striking operation is performed as follows: a driving shaft 3 rotates as driven by rotation of the brushless motor 2, the rotation of the driving shaft 3 is transmitted to the crank shaft 6 having an eccentric pin 5 through the first gear 4, the piston 9 is moved reciprocally through the conrod 7 rotatably installed to the eccentric pin 5 and the piston pin 8, the striking piece 10 is moved reciprocally through an air spring intervening between the piston 9 and the striking piece 10, and a substantial center of the striking piece 10 strikes the tip tool through the intermediate piece 11. The rotating operation is performed as follows: the rotation of the driving shaft 3 is transmitted to an intermediate shaft 13 having a tooth part 13a through the second gear 12, and then transmitted by rotating the cylinder 15 through the third gear 14 engaged with the tooth part 13a, so as to rotate the tip tool by rotating the tool maintaining element 16.

Figure 2:
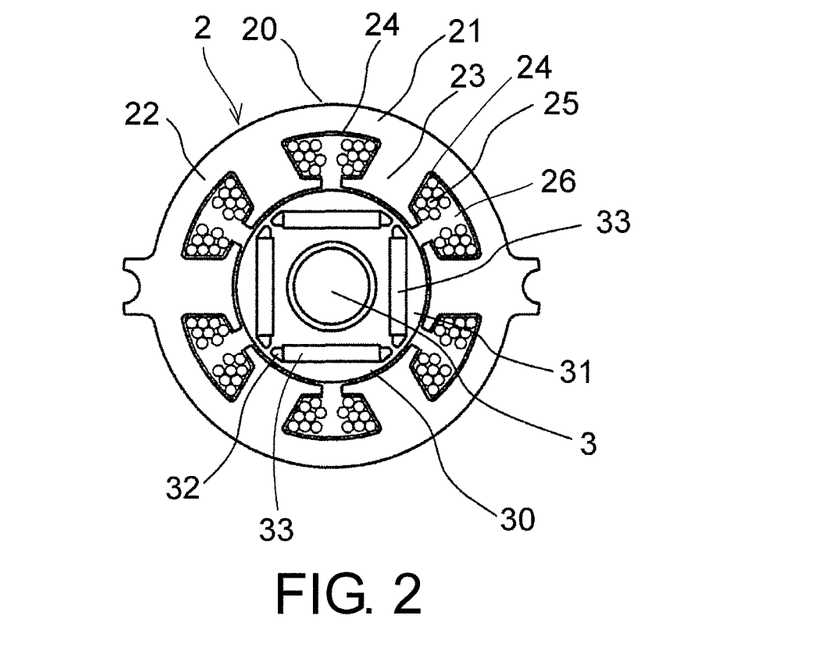
FIG. 2 is a traverse cross-sectional view illustrating a brushless motor of the embodiment.
Figure 3:
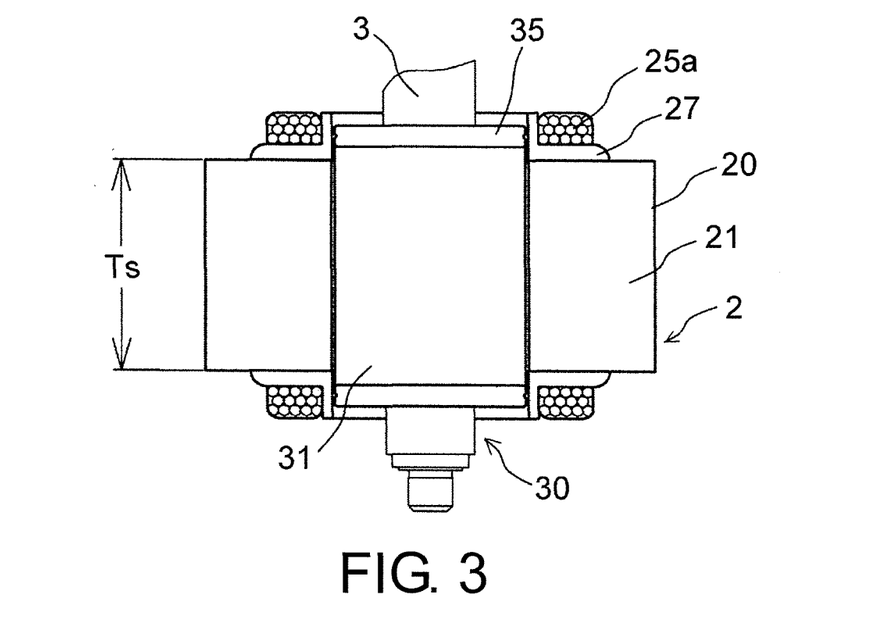
FIG. 3 is a longitudinal cross-sectional view illustrating the motor of the embodiment.

FIG. 2 is a traverse cross-sectional view illustrating the brushless motor 2, and FIG. 3 a longitudinal cross-sectional side view of the same. In the figures, a fixed part of the brushless motor 2 fixed to the housing 17 shown in FIG. 1 has a stator 20, and a rotating part of the brushless motor 2 rotatably supported on an inner circumference side of the stator 20 by making use of the housing 17 has a rotor 30.

Figure 4:
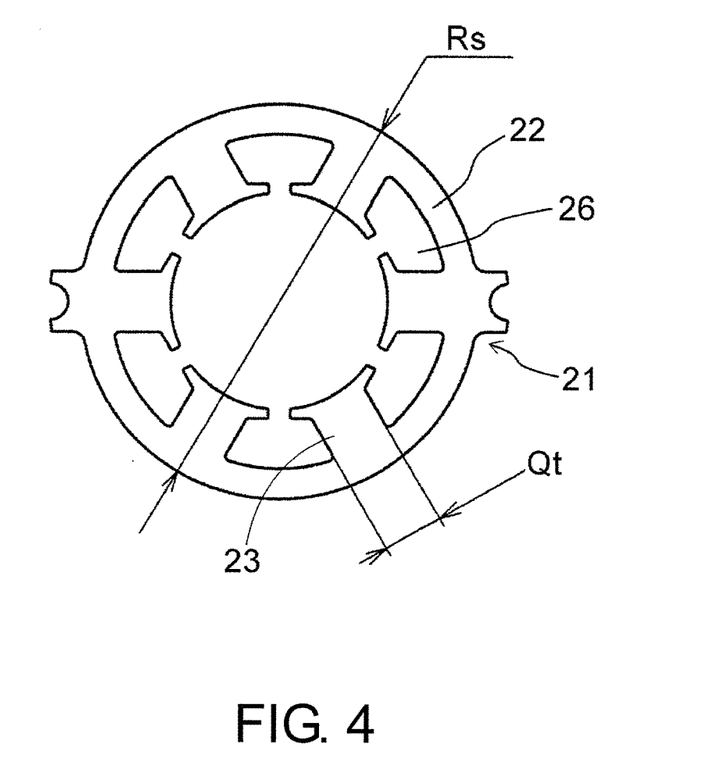
FIG. 4 is a traverse cross-sectional view illustrating a stator core of the embodiment.

The stator 20 has a stator core 21 laminated with an electromagnetic steel sheet. As shown in FIG. 4, the stator core 21 has a yoke 22 allowing a magnetic flux to flow in a circumferential direction and six teeth 23 disposed side by side in the circumferential direction to allow the magnetic flux to flow in a radical direction. A slot 26 is provided between adjacent teeth 23. For each of the teeth 23, a resin-made insulator 24 capable of electrical insulation and damage prevention is wound around a stator coil 25.

Figure 5:
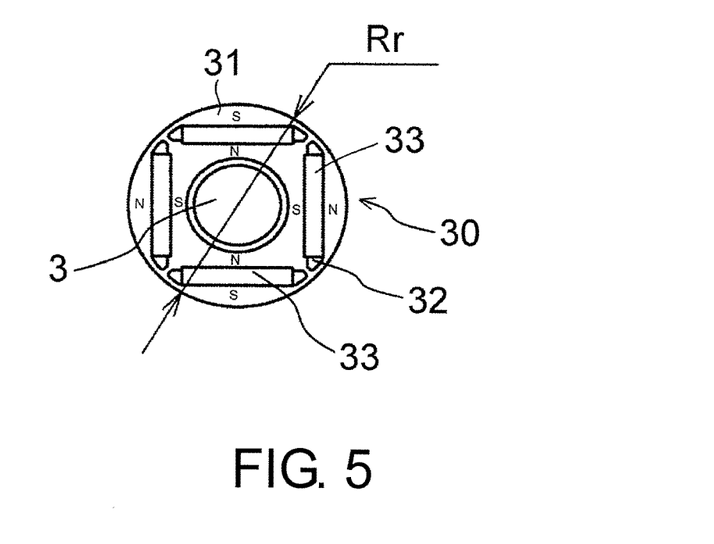
FIG. 5 is a traverse cross-sectional view illustrating a rotor of the embodiment.

As shown in FIG. 5, the rotor 30 has a rotor core 31. A total of four plate magnets 33 are disposed in four gaps (slit holes) 32 of the rotor core 31. The plate magnet 33 is magnetized such that, with respect to a wide width surface, one side is of N polarity, whereas the other side is of S polarity. The driving shaft 3 penetrates through a central part of the rotor core 31 and is fixed so as to integrally rotate with the rotor core 31.

As shown in the cross-section of FIG. 3, balance rings 35 made of metal are disposed on two ends of the rotor core 31 to weight-balance the rotor 30. As coil end parts 25a, the stator coils 25 protrude from two ends of the laminated stator core 21. An insulator 27 is disposed between the core end part 25a and the stator core 21. A width of the laminated stator core 21 is defined as a stator core lamination thickness Ts.

FIG. 4 illustrates a stator core outer diameter Rs and a tooth width Qt. The stator core outer diameter Rs is a diameter of an outer circumference part of the yoke 22. A total tooth width Q is defined as follows: total tooth width=tooth width×tooth number. In an example for numerical values of the embodiment, the total tooth width Q is 10 mm×6=60 mm.

FIG. 5 illustrates a rotor outer diameter Rr. The rotor outer diameter Rr represents a diameter of an outer circumference part of the rotor.

Figure 6:
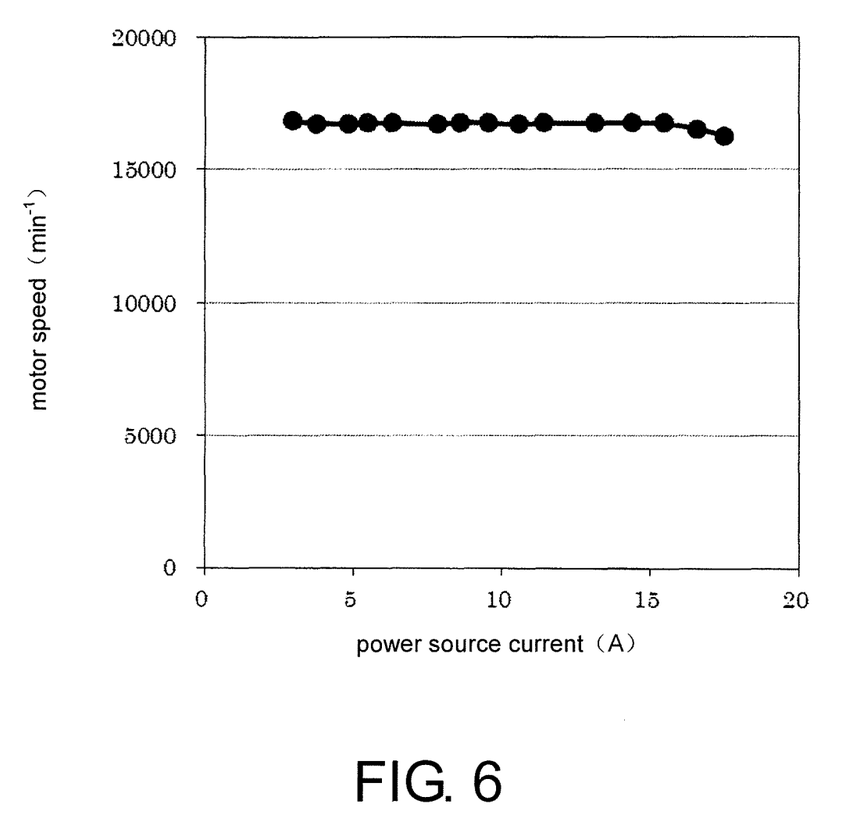
FIG. 6 is a curve diagram illustrating a relation between motor speed and power current.

FIG. 6 shows motor characteristics of the brushless motor 2 used in the hammer drill of this embodiment. Since the brushless motor 2 for the hammer drill is matched precisely with the rotary striking mechanism unit 19 shown in FIG. 1, even if a load is applied to the brushless motor 2 during an operation, the control circuit may still exert fixed speed control by having the brushless motor 2 rotate at a target speed. Since the rotary striking mechanism unit is formed by a plurality of components performing complicated operations, if the motor speed is deviated from the target value, the striking performance may be reduced. As a way of fixed speed control, it is common to feedback the motor speed while exerting duty control on a power source voltage.

Table 1 is a table showing optimized motor sizes with respect to the hammer drill.

TABLE 1

|  | | Case 1 | Case 2 | Case 3 | Case 4 | Case 5 | Case 6 | Case 7 | Case 8 | Case 9 |
|---|---|---|---|---|---|---|---|---|---|---|
| rated power input | W | 1150 | 1150 | 1150 | 1150 | 1150 | 1150 | 1150 | 1150 | 1150 |
| motor speed under fixed speed control | rpm | 16800 | 16800 | 16800 | 16800 | 16800 | 16800 | 16800 | 16800 | 16800 |
| outer diameter of stator core | mm | 45.82 | 48.42 | 52.975 | 58.5 | 65 | 71.5 | 74.88 | 76.505 | 83.85 |
| stator core lamination thickness | mm | 80.5 | 72.1 | 60.2 | 49.4 | 40 | 33.1 | 30.1 | 28.9 | 24.0 |
| total tooth width | mm | 42.3 | 44.7 | 48.9 | 54 | 60 | 66 | 69.12 | 70.62 | 77.4 |
| outer diameter of rotor | mm | 24.3 | 25.6 | 28.0 | 31.0 | 34.4 | 37.8 | 39.6 | 40.5 | 44.4 |
| S coil resistance | Ω | 0.95 | 0.82 | 0.70 | 0.52 | 0.46 | 0.52 | 0.72 | 0.79 | 0.90 |
| Ku | — | 9.0 | 10.0 | 12.0 | 14.6 | 18.1 | 21.8 | 24.0 | 25.0 | 30.0 |

In Table 1, target performance of a motor corresponding to a 40 mm-level hammer drill is set as having a rated power input of 1150 W and a motor speed under the fixed speed control at 16800 min$^{-1}$ (RPM). Based on the respective stator core outer diameters Rs, the stator core lamination thicknesses Ts applicable for the device are respectively determined under a premise that even if the outer diameters Rs are different, the stator cores still have the same volume. Accordingly, the total tooth widths Q and the rotor outer diameters Rr (Case 1 to Case 9) are derived by having a resistance of the stator coils at the lowest. According to sizes of Case 1 to Case 9, values of an optimization variable Ku defined in Expression (1) below are calculated.

$$Ku=\{(\text{stator core outer diameter})^2 \times (\text{stator core lamination thickness}) \times (\text{total tooth width}) \times (\text{rotor outer diameter})\} \div \{(\text{rated power input}) \times (\text{motor speed under fixed speed control})\} \quad (1)$$

Here, the stator core outer diameter is a numerical value shown in mm, the stator core lamination thickness is a numerical value shown in mm, the total tooth width is a numerical value shown in mm, the rotor outer diameter is a numerical value shown in mm, the rated power input is a numerical value shown in W, and the motor speed is a numerical value shown in min$^{-1}$ (RPM).

Figure 7:
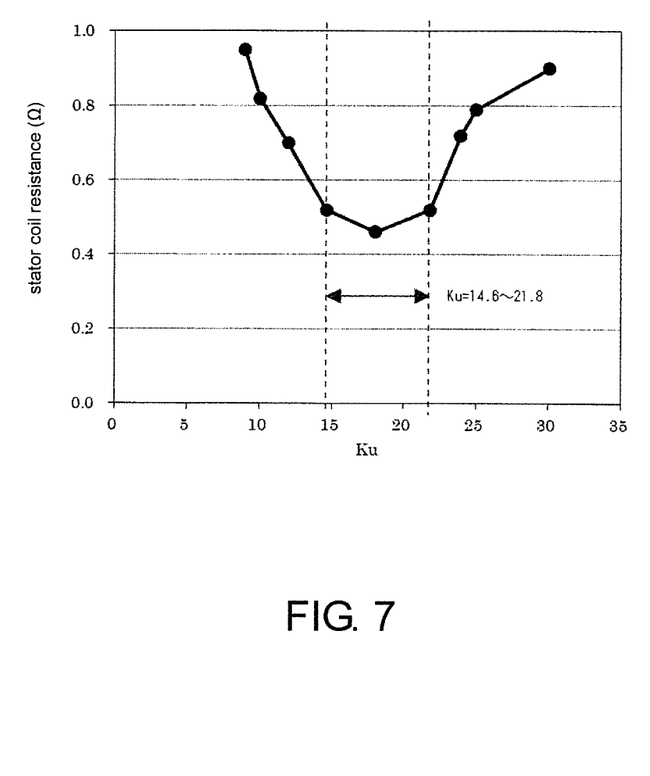
FIG. 7 is a curve diagram illustrating a relation between optimized stator coils and an optimization variable Ku with respect to the hammer drill.
Figure 8:
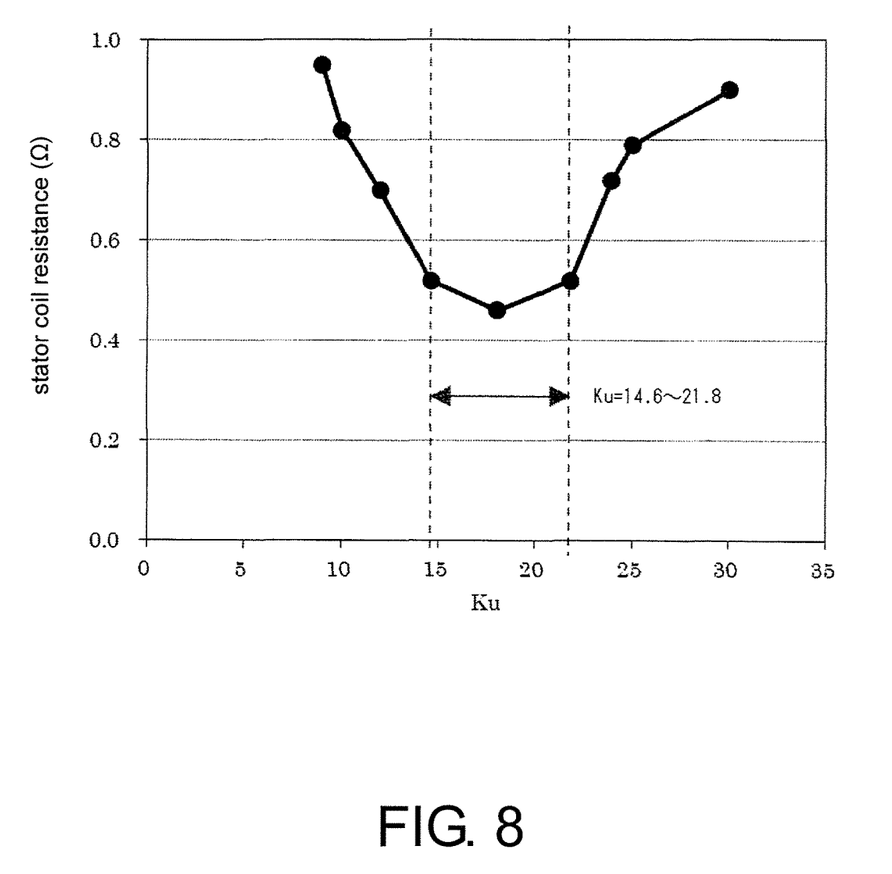

Moreover, as shown in FIG. 7, if a curve diagram is illustrated using Ku as the horizontal axis and the resistance of the stator coils as the vertical axis, the resistance of the stator coils is most effectively lowered when the value of Ku of the brushless motor is set to 14.6≤Ku≤21.8 (i.e., the range of Case 4 to Case 6 of Table 1). When the resistance of the stator coils is lowered, a copper loss is reduced and an increase in temperature is also reduced. Thus, the rated power input of 1150 W may be easily achieved. Moreover, since a motor efficiency is facilitated, the motor speed is increased, making it easier to achieve the motor speed of 16800 min$^{-1}$. Furthermore, since a design of magnetic properties is optimized, and the rotor outer diameter Rr is in a suitable size, when the plate magnets 33 having a low cost are disposed in the rotor 30, high performance as well as low cost may be achieved at the same time. Also, the stator core outer diameter Rs and the stator core lamination thickness Ts are in suitable sizes. Thus, the size of the housing 17 shown in FIG. 1 does not need to be increased to be able to store the brushless motor 2, so a motor storage portion of the housing 17 does not need to be increased, either.

Besides, when a ratio between the outer diameters of the stator core 21 and the rotor 30 satisfies the value of Ku, if the number of slots of the stator core 21 is set at six, it is easy to wind the stator coils 25 having a greater diameter. Therefore, the resistance of the stator coils may be lowered most effectively. This is because that, if the number of slots of the stator is too few, the number of turns of the coil wound in one slot is increased, making it difficult to wind the coil in alignment and thus unable to wind the stator coil 25 having a greater diameter. Also, if the number of slots of the stator is increased, gaps for insertion of coil winding devices must be disposed in the respective slots 26 during a winding operation. Thus, the gaps for winding the stator coils 25 may be reduced, making it unable to wind the stator coils 25 having a greater diameter.

In addition, in the Table 1, the values of Case 1 to Case 9 are obtained by setting the rated power input at 1150 W and the motor speed under the fixed speed control at 16800 min$^{-1}$. However, in cases where the rated power input ranges from 1000 to 1300 (W) and the motor speed under the fixed speed control at 16800±10% min$^{-1}$, the same range of the value of Ku is also applicable.

With the embodiment, the following effects are achievable.

(1) An electric striking tool as follows is achieved. Namely, the electric striking tool has the brushless motor 2 of a size not damaging the operability, and is able to achieve the required target performance, namely the rated power output ranging from 1000 to 1300 (W) and the motor speed tinder the fixed speed control at 16800±10%(min$^{-1}$).

(2) The brushless motor 2 is able to be designed such that the stator coils have the lowest resistance, so as to reduce the copper loss and reduce the increase in temperature in practical use. Accordingly, the motor efficiency is also increased.

(3) The rotor outer diameter Rr is in suitable size ranging from 31.0 mm to 37.8 mm. Therefore, when the low-cost plate magnets 33 are disposed in the rotor 30, high performance as well as low cost may be achieved at the same time.

(4) If the number of slots of the stator core 21 is set at 6, it is easy to wind the stator coils 25 having a greater diameter in attempt to further reduce the resistance of the stator coils.

In view of the foregoing, the invention is described by taking the embodiments as examples. However, people having ordinary skills in the art should understand that various modifications may be made to the respective forming elements or treatment processes of the embodiments within the scope as recited in the claims. In the following, examples of such modifications are described.

In the embodiments, the plate magnets are inserted into the gaps of the rotor core to serve as the rotor. However, a rotor using a cylindrical magnet where N polarity and S polarity are alternately formed on an outer circumference surface.

In addition, in the embodiments, a hammer drill is exemplified. However, the invention may also be applied to an electric striking tool for striking and rotating that uses a brushless motor as the driving source, such as an impact drill, an impact wrench, or the like, or an electric tool without a striking mechanism, such as a driver drill.

What is claimed is:

1. An electric tool, comprising:
a brushless motor having a stator where stator coils are wound around teeth of a stator core, and a rotor rotatably supported on an inner circumference side of the stator; and
a rotary striking mechanism unit, converting a rotational force of the brushless motor into a striking force and applying the striking force to a tip tool,
wherein the brushless motor has a rated power input ranging from 1000 to 1300 W and a motor speed under fixed speed control at 16800±10% revolution per minute, and wherein:
when an optimization variable (Ku) relating to the brushless motor is defined by Expression as follows:

$(Ku)=\{(\text{stator core outer diameter})^2 \times (\text{stator core lamination thickness}) \times (\text{total tooth width}) \times (\text{rotor outer diameter})\} \div \{(\text{rated power input}) \times (\text{motor speed under fixed speed control})\}$, wherein the stator core outer diameter is a numerical value shown in mm, the stator core lamination thickness is a numerical value shown in mm, the total tooth width is a numerical value shown in mm and is from 54 to 66, the rotor outer diameter is a numerical value shown in mm, the rated power input is a numerical value shown in W, and the motor speed is revolutions per minute,
a value of (Ku) of the brushless motor is set to $14.6 \leq (Ku) \leq 21.8$.

2. The electric tool as claimed in claim 1, wherein:
the rotor has plate magnets.

3. The electric tool as claimed in claim 1, wherein:
the stator core has six slots.

4. An electric tool, comprising:
a brushless motor having a stator where stator coils are wound around teeth of a stator core, and a rotor rotatably supported on an inner circumference side of the stator; and
a transmission part transmitting a rotational force of the brushless motor to a tool maintaining element,
wherein the brushless motor has a rated power input ranging from 1000 to 1300 W and a motor speed under fixed speed control at 16800±10% revolutions per minute, and wherein:
when an optimization variable (Ku) relating to the brushless motor is defined by Expression as follows:

$(Ku)=\{(\text{stator core outer diameter})2 \times (\text{stator core lamination thickness}) \times (\text{total tooth width}) \times (\text{rotor outer diameter})\} \div \{(\text{rated power input}) \times (\text{motor speed under fixed speed control})\}$, wherein the stator core outer diameter is a numerical value shown in mm, the stator core lamination thickness is a numerical value shown in mm, the total tooth width is a numerical value shown in mm and is from 54 to 66, the rotor outer diameter is a numerical value shown in mm, the rated power input is a numerical value shown in W, and the motor speed is revolution per minute,
a value of (Ku) of the brushless motor is set to $14.6 \leq (Ku) \leq 21.8$.

* * * * *